United States Patent
Nyzen et al.

(10) Patent No.: US 10,451,053 B2
(45) Date of Patent: Oct. 22, 2019

(54) HYDROMECHANICAL PRESSURE COMPENSATION CONTROL OF A VARIABLE DISPLACEMENT PUMP IN A CENTRIFUGAL PUMPING AND METERING SYSTEM AND ASSOCIATED METHOD

(71) Applicant: EATON CORPORATION, Cleveland, OH (US)

(72) Inventors: Robert Nyzen, Hiram, OH (US); Martin A. Clements, North Royalton, OH (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 560 days.

(21) Appl. No.: 14/397,604

(22) PCT Filed: May 1, 2013

(86) PCT No.: PCT/US2013/039005
§ 371 (c)(1),
(2) Date: Oct. 28, 2014

(87) PCT Pub. No.: WO2013/166108
PCT Pub. Date: Nov. 7, 2013

(65) Prior Publication Data
US 2015/0075634 A1 Mar. 19, 2015

Related U.S. Application Data

(60) Provisional application No. 61/641,088, filed on May 1, 2012, provisional application No. 61/664,422, filed on Jun. 26, 2012.

(51) Int. Cl.
*G05D 16/16* (2006.01)
*F04D 13/12* (2006.01)
(Continued)

(52) U.S. Cl.
CPC .............. *F04B 49/08* (2013.01); *F04B 23/10* (2013.01); *F04B 23/14* (2013.01); *F04D 13/12* (2013.01);
(Continued)

(58) Field of Classification Search
CPC .......... F04B 23/10; F04B 23/14; F04B 49/08; F04D 13/12; F02C 7/22; F02C 7/236; F02C 9/263; G05D 13/16; Y10T 137/86002
(Continued)

(56) References Cited

U.S. PATENT DOCUMENTS 4,229,939 A * 10/1980 Smith ...................... F02C 9/263
                                                                    60/243
4,332,527 A *  6/1982 Moldovan ............... F02C 7/236
                                                                   415/121.2
(Continued)

OTHER PUBLICATIONS

PCT/US2013/039005, "International Search Report and Written Opinion", dated Oct. 24, 2014.
(Continued)

*Primary Examiner* — Dominick L Plakkoottam
*Assistant Examiner* — Connor J Tremarche
(74) *Attorney, Agent, or Firm* — Fay Sharpe LLP

(57) ABSTRACT

A pump assembly includes a pump unit having a centrifugal pump and a variable pump supplying pressurized flow. A fuel control assembly receives flow from the pump unit and includes at least one metering valve and at least one throttling valve. A control for the variable pump receives first and second pressure signals indicative of a pressure differential across the throttling valve, or across the metering valve/throttling valve combination, for altering operation of the variable pump in response to the pressure differential.

23 Claims, 3 Drawing Sheets

(51) Int. Cl.
*F04B 49/08* (2006.01)
*F04B 23/10* (2006.01)
*F04B 23/14* (2006.01)

(52) U.S. Cl.
CPC ........ *G05D 16/16* (2013.01); *Y10T 137/0396* (2015.04); *Y10T 137/86002* (2015.04)

(58) Field of Classification Search
USPC .......................................................... 417/283
See application file for complete search history.

(56) References Cited

U.S. PATENT DOCUMENTS

| | | | |
|---|---|---|---|
| 5,111,653 A | 5/1992 | Leeson | |
| 5,118,258 A | 6/1992 | Martin | |
| 5,123,810 A * | 6/1992 | Hansen | F02C 7/22 415/143 |
| 5,715,674 A | 2/1998 | Reuter et al. | |
| 6,810,674 B2 * | 11/2004 | Clements | F02C 9/263 60/39.281 |
| 6,981,359 B2 * | 1/2006 | Wernberg | F02C 7/232 60/39.281 |
| 7,007,452 B1 | 3/2006 | Baryshnikov et al. | |
| 7,096,658 B2 | 8/2006 | Wernberg et al. | |
| 7,108,493 B2 | 9/2006 | Clements et al. | |
| 7,431,015 B2 | 10/2008 | Mahoney et al. | |
| 7,491,043 B2 | 2/2009 | Clements et al. | |
| 7,770,388 B2 | 8/2010 | Desai | |
| 7,845,177 B2 | 12/2010 | Parsons | |
| 7,913,674 B2 * | 3/2011 | Tsuda | F02D 9/02 123/568.16 |
| 7,966,994 B2 | 6/2011 | Klecker | |
| 8,205,597 B2 | 6/2012 | Brocard et al. | |
| 2004/0011052 A1 | 1/2004 | Clements | |
| 2005/0223690 A1 | 10/2005 | Wernberg et al. | |
| 2007/0175449 A1 | 8/2007 | Mahoney et al. | |
| 2008/0163931 A1 | 7/2008 | Brocard et al. | |
| 2009/0301575 A1 | 12/2009 | Arnett | |
| 2010/0037867 A1 * | 2/2010 | Kleckler | F02C 7/236 123/510 |
| 2015/0125313 A1 * | 5/2015 | Nyzen | F04B 23/10 417/53 |

OTHER PUBLICATIONS

PCT/US2013/039005, "International Preliminary Report on Patentability (Chapter 1 of the Patent Cooperation Treaty)", dated Nov. 18, 2014.

* cited by examiner

HYDROMECHANICAL PRESSURE COMPENSATION CONTROL OF A VARIABLE DISPLACEMENT PUMP IN A CENTRIFUGAL PUMPING AND METERING SYSTEM AND ASSOCIATED METHOD

BACKGROUND

The present exemplary embodiment relates to a pump system, and more particularly to a system that includes a high speed centrifugal pump and a variable displacement pump. It finds particular application in conjunction with a fuel metering system, and will be described with particular reference thereto. However, it is to be appreciated that the present exemplary embodiment is also amenable to other like applications.

Generally, a high speed centrifugal pump is desired in a pump system because of the benefits related to power consumption. Further, the centrifugal pump is generally lightweight, is deemed to have an extended life, has limited pressure ripple, and is generally conducive for a wide array of downstream uses. When trying to apply high-speed centrifugal pump technology in connection with fuel pumps associated with aircraft engine applications, for example, certain conditions need attention. Engine start is one area because the high speed centrifugal pump does not provide the required elevated fuel pressures for start-up until the engine speed has increased to a certain level. Therefore, there is a need to start the engine with a relatively low drive speed. However, the pump system can become excessively large for the balance of pump operating conditions, i.e., idle, cruise, climb, etc. if engine start-up were the only parameter concern. A large pump, in turn, creates a series of system issues revolving around the thermal impacts on the system. Likewise, there are size constraints and weight issues that must be addressed in designing an effective fuel pump system.

Therefore, a variable displacement pump is often incorporated into the pump system to address the low pressure rise from the centrifugal pump at low engine speed. The variable displacement pump provides the additional required pressure and flow at engine start. In addition to using the variable displacement pumping stage to provide engine start, i.e. satisfy engine start requirements, the variable displacement pump likewise delivers pressures beyond the maximum pressure delivered by the centrifugal stage when needed for other uses.

In order to provide accurate metered flow, and reduce the pressure to a level required downstream, a centrifugal based pump and metering system works based on pressure generation from the centrifugal pump and a throttling style metering system. However, for the variable displacement pump to work in the throttling style metering system, the variable displacement pump must be pressure compensated. This would allow the centrifugal pump at low speed to combine with the additional pressure and flow offered by the variable displacement pump to meet start-up requirements. Further, the variable displacement pump can then be advantageously used to provide a pressure increase above the discharge of the centrifugal pump output once the centrifugal pump has reached a maximum speed and maximum pressure output and there is a need for additional output.

Accordingly, a need exists for providing additional system capability (and associated method) to a pump unit that includes a centrifugal pump and throttling style metering system in a manner that is economical, effective, compact, simple, automatic, pressure compensated, and adaptable to one or more metering loops.

BRIEF DESCRIPTION

A pump unit includes a high speed centrifugal pump unit and a variable pump supplying pressurized flow. A fuel control assembly receives flow from the pump unit and includes at least one metering valve, and at least one throttling valve that receives flow from the metering valve. A control for the variable pump receives first and second signals indicative of a pressure differential across at least the throttling valve for altering operation of the variable pump in response to the pressure differential.

The first and second signals may be indicative of the pressure differential across the combination of the metering valve and throttling valve.

The control is a hydromechanical pressure compensation assembly and the first and second signals are pressure signals in a preferred arrangement.

If more than one throttling valve is present, the control is responsive to the throttling valve (or metering valve/throttling valve combination) with the lowest differential pressure.

At a minimum differential pressure, only the centrifugal pump provides pressure to the fuel control assembly.

At higher differential pressures, the variable pump is commanded by the control to a minimum displacement output.

If the differential pressure falls below the minimum differential pressure, the control signals for the variable pump to increase the displacement and provide sufficient pressure to maintain the minimum pressure level across the throttling valve or metering valve/throttling valve combination.

In one preferred arrangement, the variable pump is a variable displacement pump having a freely rotating cam ring, and the variable pump and the centrifugal pump are driven at different relative rotational speeds (e.g., the variable pump is driven at approximately 50% of the rotational speed of the centrifugal pump in one embodiment, and may be coaxially driven).

An inducer stage is provided in one modification and driven at a reduced rotational speed to operatively improve inlet performance characteristics of the centrifugal pump.

A method of operating a pump assembly includes providing a pump unit that includes a high speed centrifugal pump and a variable pump to supply pressurized flow. The method further includes providing a fuel control assembly that receives flow from the pump unit and includes at least one metering valve and at least one throttling valve that receives flow from the at least one metering valve. The method also includes monitoring pressure differential across at least the throttling valve and controlling operation of the pump unit in response to the pressure differential.

The method further includes receiving a first pressure signal upstream of the throttling valve, or upstream of the metering valve and the throttling valve combination, that is communicated to the fuel control assembly, and a second pressure signal from downstream of the throttling valve, or the metering valve/throttling valve combination.

The method includes a step of using the signals to hydromechanically alter operation of the pump unit.

In one embodiment, the method includes using a variable displacement ring pump as the variable pump and allowing a cam ring thereof to freely rotate to reduce viscous drag.

The method includes using an inducer driven at a reduced rotational speed to operatively improve inlet performance characteristics of the centrifugal pump.

A primary benefit is the ability to supplement centrifugal pump output in a pump unit.

An advantage resides in incorporating a variable displacement pumping stage to provide engine start and increased pressures at desired times.

Desirably, the variable displacement pump is automatically engaged only when necessary.

Further, the variable displacement pump is preferably controlled via a hydromechanical pressure.

Still other advantages and benefits of the disclosure will become apparent from reading and understanding the following detailed description.

DETAILED DESCRIPTION

Figure 1:
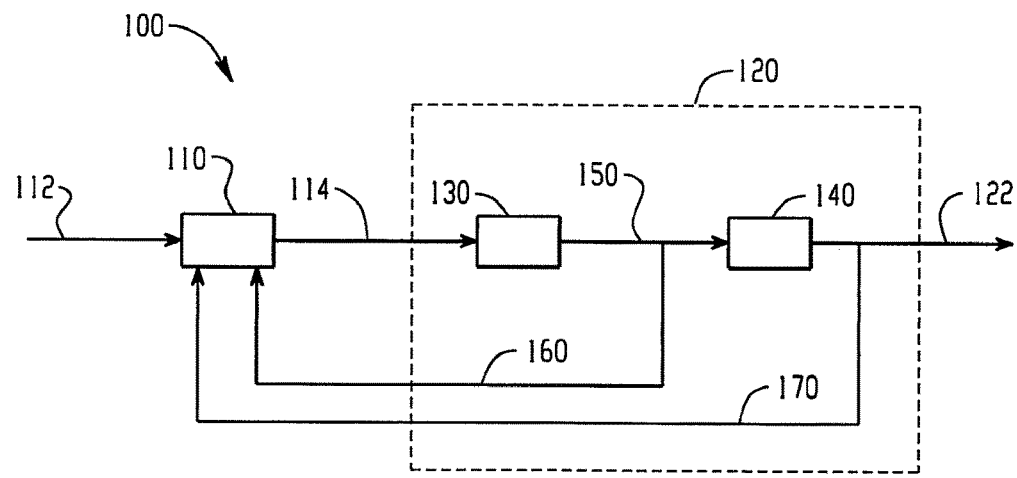
FIG. 1 is a schematic representation of the pump assembly in a single metering loop configuration.

FIG. 1 is a schematic representation of a pumping and metering system 100, and in particular is representative of a single metering loop. The system 100 includes a pump unit 110 such as a fuel pump for an aircraft engine that receives fluid from an upstream source (not shown) as represented by reference numeral 112 and delivers pressurized fluid 114 to a downstream fuel control 120 that controls fluid for one or more downstream uses represented by reference numeral 122. In the broadest sense, the fuel control 120 includes a metering valve 130 and a throttling valve 140.

The metering valve 130 receives the pressurized fluid 114 from the pump unit 110 and meters or delivers pressurized fluid 150 downstream to the throttling valve 140. The pump unit 110, and typically one used as a fuel pump for an aircraft engine, for example, includes a centrifugal pump for the reasons noted in the Background. As further described above, additional use of a variable displacement pump is also desired to supplement/provide the required pressure and flow for certain conditions. In order to use a variable displacement pump in this system, the variable displacement pump must be pressure compensated so as to perform with the throttling style fuel metering unit that is required for the centrifugal pump.

One method of control for the variable displacement pump is to set a pressure compensation level. A problem is that this level must be set above the maximum that is needed by the system. Although this preselected pressure compensation level works well, the system power consumption is excessive when the variable displacement pump is active. Therefore, there is a need to have a variable pressure compensation level.

FIG. 1 schematically represents a method of control that varies operation of the variable displacement pump in response to varying pressure. More particularly, a first signal or first pressure signal 160 references the pressure of the fluid 150 at a location downstream of the metering valve 130 and upstream of the throttling valve 140. The first pressure signal 160 returns to the pump unit 110, and more particularly communicates with a control portion of the pump unit operatively associated with the variable displacement pump. In addition, a second signal or second pressure signal 170 is indicative of the pressure of the pressurized fluid downstream from the throttling valve 140. The second pressure signal 170 is likewise returned to the pump unit 110, and more particularly to a control portion of the pump unit associated with the variable displacement pump. The first and second pressure signals 160, 170 sense the pressure differential or pressure drop across the throttling valve 140, or sense the pressure differential across the metering valve/throttling valve combination. A minimum differential pressure is allowable in this system 100 and in such a situation only the centrifugal pump generates the pressure rise. If the differential pressure falls below this minimum, the control signals 160, 170 for the variable displacement pump increase the displacement to provide enough pressure to maintain the minimum pressure level across the throttling valve 140. Thus, this arrangement and associated method of control provides for a variable pressure compensation level. The arrangement ensures that the downstream pressure requirements are always maintained and the system power level is maintained to a minimum. One skilled in the art will also appreciate that at higher pressure differentials, the variable displacement pump is commanded to a minimum displacement because the centrifugal pump satisfies the system needs.

Figure 2:
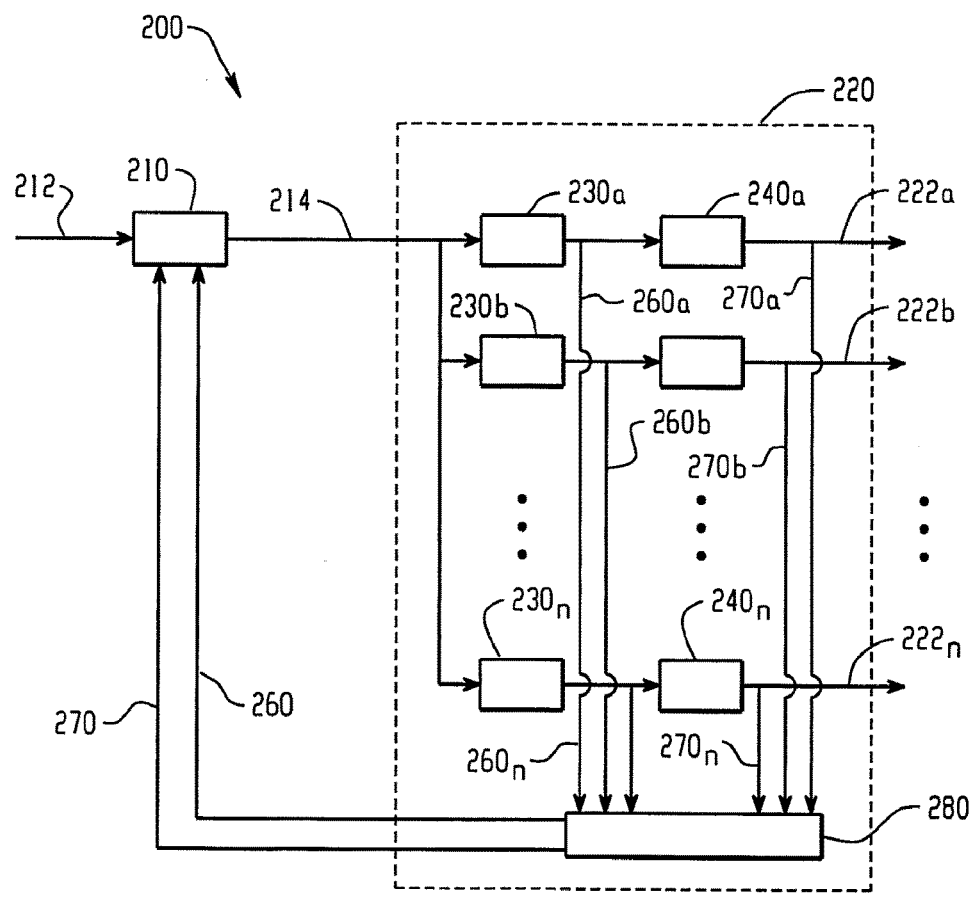
FIG. 2 is a schematic representation of the pump assembly in a multiple metering loop configuration.

FIG. 2 is a schematic representation of a pumping and metering system 200 substantially similar to the system 100 described in connection with FIG. 1 and with the addition of multiple throttling valves. For purposes of brevity and ease of reference, like reference numerals in the "200" series will refer to like elements in the "100" series, and new reference numerals will be used to refer to new components. Likewise, the above description of the components and operation thereof in connection with FIG. 1 applies to the components and system of FIG. 2 unless noted otherwise. For example, pump unit 210 in FIG. 2 corresponds to pump unit 110 in FIG. 1. The fuel control 220 includes multiple metering valves $230a$, $230b$, ... $230_n$ and similarly a like number of throttling valves $240a$, $240b$ ... $240_n$ that cooperate with a respective metering valve. In the system of FIG. 2, the throttling valve (or metering valve/throttling valve combination) with the lowest differential pressure is used to provide the first and second pressure signals 260, 270 to the pump unit 210, and more specifically to the control associated with the variable displacement pump of the pump unit. Thus, a selector (or series of selector valves) 280 serves as a comparator so that the lowest pressure drop is ultimately communicated to the pump unit 210.

When the pressure drop or pressure differential across the throttling valve 240 is high, it is likely that the additional pressure provided by the variable displacement pump is unnecessary. In other instances, such as engine start or other system operations where the high speed centrifugal pump may not provide all the desired pressure, the output of the high speed centrifugal pump is supplemented by the variable displacement pump in order to meet system requirements. More importantly, the level at which the variable displacement pump is operated is now variable, i.e., not just "on" or "off", and that variable operation is hydromechanically responsive to monitoring of the pressure situation downstream, namely by monitoring the change in pressure across one or more throttling valves 240, or the metering valve/throttling valve combinations.

Figure 3A:
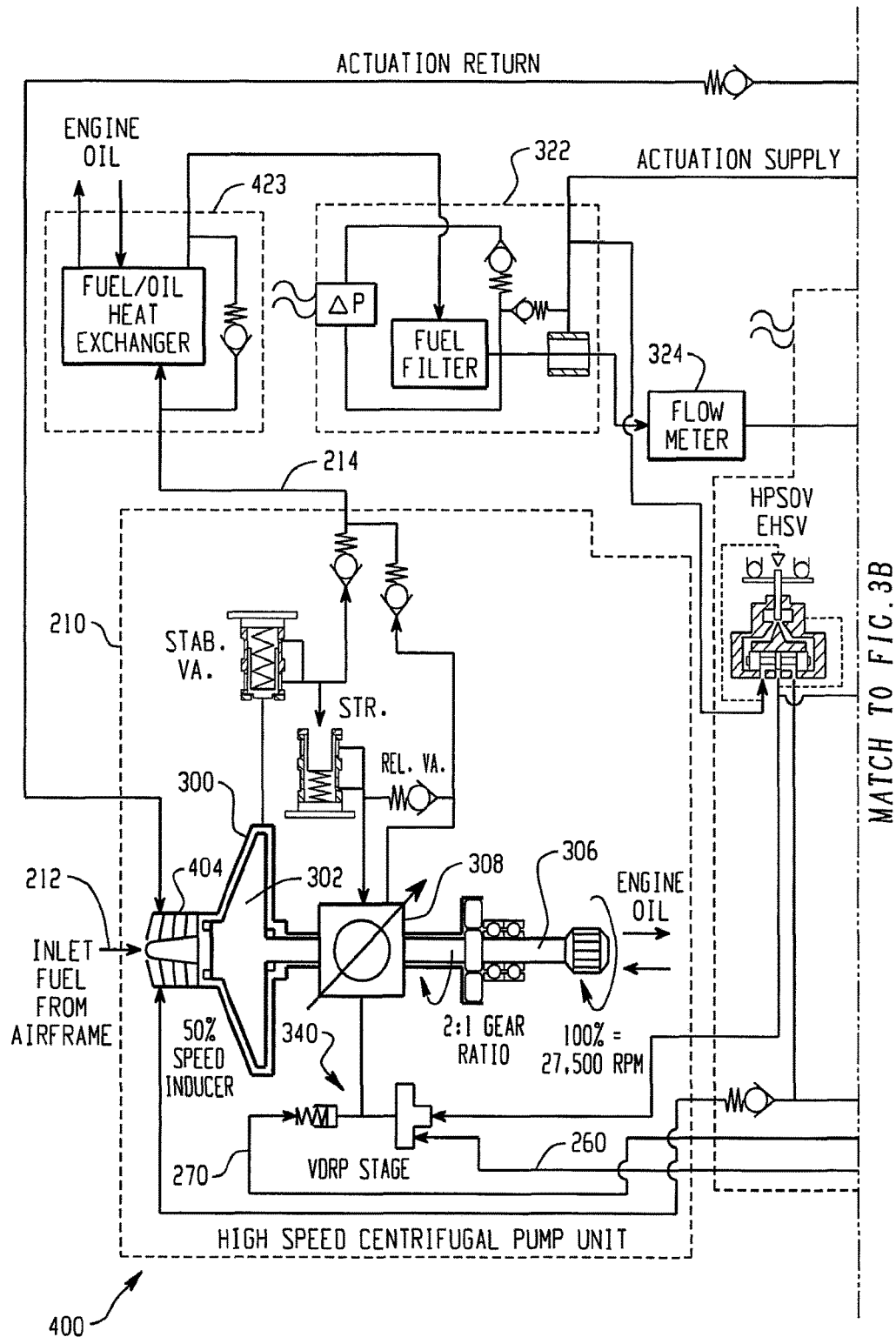
FIG. 3 is a system schematic of a pump unit that provides pressurized fluid to an actuation control module and a fuel metering unit.
Figure 3B:
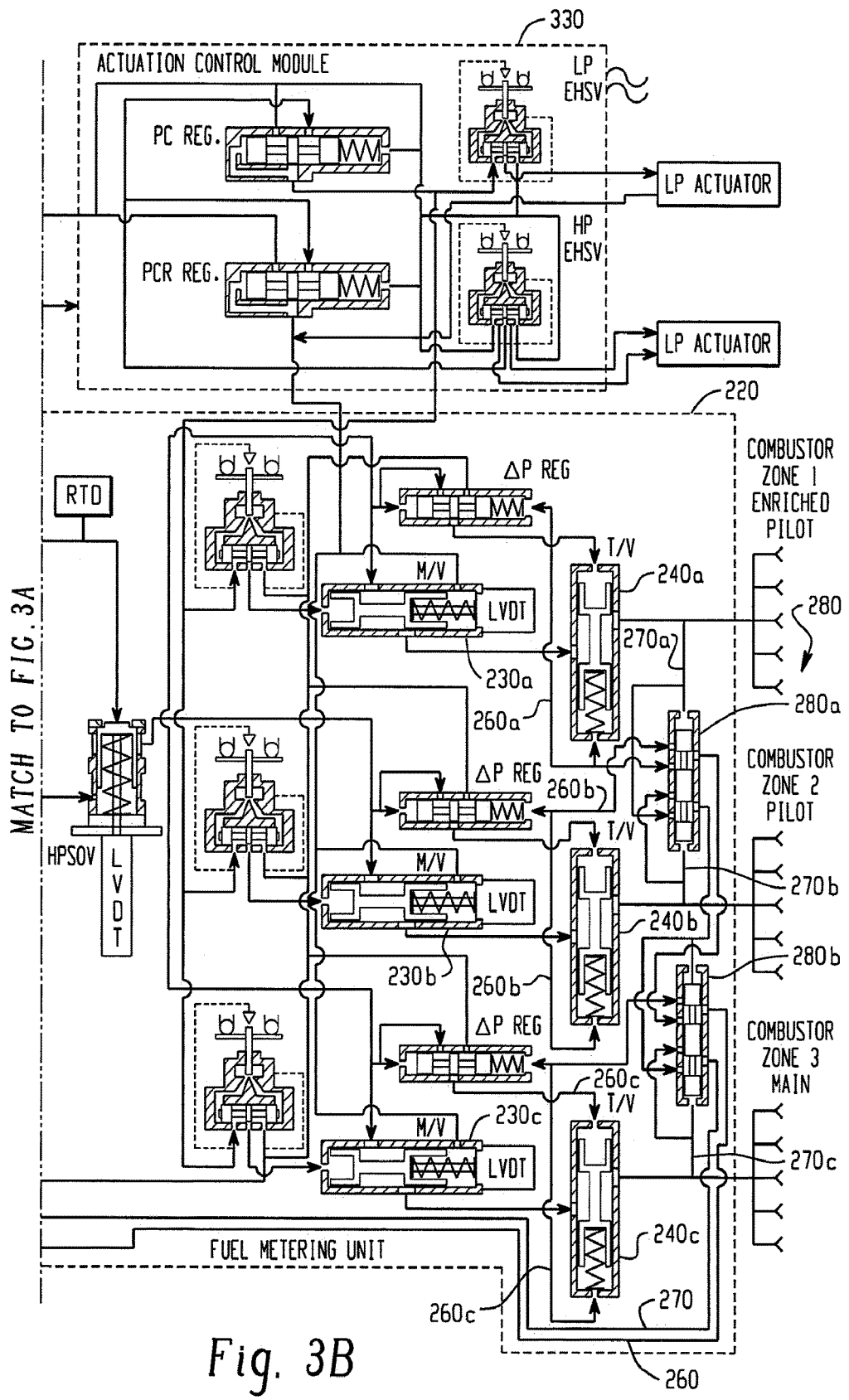

FIG. 3 is a further schematic representation of a pumping and metering system 200 with some additional detail of the components more generally referred to in FIGS. 1 and 2. For example, the pump unit 210 includes a high speed centrifugal pump represented by housing 300 that receives an impeller 302. An inducer 304 may be provided at the inlet to the centrifugal pump 300 to improve inlet performance and particularly performance at a low speeds such as encountered with engine start. Drive shaft 306 provides the rotational input to the impeller 302. The variable displacement pump 308 is also rotated by drive shaft 306, and more particularly in this instance includes a coaxial shaft 310 that rotates at a reduced speed (for example 50%) provided by the drive gear transmission that has a desired gear ratio (in this example, a 2:1 gear ratio). Thus as described above, the pump unit 210 provides pressurized fluid 214 to downstream uses. Conventional system components such as a fuel/oil heat exchanger 320, fuel filter 322, and flow meter 324 are interposed between the pump unit 210 and the fuel metering unit 220. Likewise, actuation control module 330 receives a portion of this downstream flow as is generally known in the art so that further discussion herein of these conventional components is deemed unnecessary to a full and complete understanding of the present disclosure.

As schematically represented in FIG. 3, multiple metering loops are illustrated and particularly three loops are shown, although a greater or lesser number of loops can be used without departing from the scope and intent of this disclosure. Specifically, each metering loop includes a metering valve 230a, 230b, 230c and a respective throttling valve 240a, 240c, 240c. Pressure downstream of each metering valve 230a, 230b, 230c, and necessarily upstream of the corresponding throttling valve 240a, 240b, 240c is sent as a first signal (260a, 260b, 260c) to a selector 280. The selector 280 is shown here as including two selector valves 280a, 280b that receive respective first pressure signals. In a similar manner, second pressure signals 270a, 270b, 270c are provided from downstream of respective throttling valves 240a, 240b, 240c to at least one of the corresponding selector valves to 280a, 280b. Thus, the first selector valve 280a compares the pressure differentials or pressure drops across the first and second throttling valves 240a, 240b and the signals from the throttling valve with the lowest pressure differential is communicated to the second selector valve 280b where it is then compared with the pressure differential across the third throttling valve 240c. The output from the second selector valve 280b is then communicated as first and second pressure signals 260, 270 to a control 340 associated with the variable displacement pump 308. A minimum differential pressure is allowed in the system and, in such a situation, only the centrifugal pump 300 is required to meet system needs. However, if the differential pressure falls below the minimum value, the control signals 260, 270 allow control 340 to alter the displacement of variable displacement pump 308 and thereby increase the displacement and provide enough pressure to maintain the minimum pressure level as required to meet system needs.

The pump unit 210 advantageously combines the high speed centrifugal pump stage 300 and the variable displacement pump 308. In one preferred arrangement, the variable displacement pump 308 is referred to as a variable displacement ring pump (VDRP) i.e. of the type generally shown and described in commonly owned U.S. Pat. Nos. 7,108,493 and 7,491,043, the disclosures of which are expressly incorporated herein by reference. This particular form of a variable displacement pump that employs a rotating cam ring (variable displacement ring pump or VDRP) is desirable because the rotating cam ring exhibits a low drag. Therefore, the VDRP can be used in conjunction with the high speed associated with the drive shaft 306. Another added benefit of the VDRP is that when it is combined with the centrifugal pump 300, a 50% speed inducer stage can be advantageously used at the inlet of the centrifugal pump to improve inlet performance characteristics.

Generally, when pressure in excess of what the high speed centrifugal pump can produce alone is required, the VDRP stage is used as a pressure compensated-style pump to supplement the high speed centrifugal pump output pressure. Typically, the VDRP will provide the majority of the pump pressure during engine start and at extreme engine takeoff conditions. The rotating cam ring of the VDRP is specifically used to minimize drag power loss at a time when the VDRP stage is not in use. Likewise, additional benefits arise by driving the VDRP at 50% of the speed of the high speed centrifugal pump impeller. In this way, the mechanical drive of a 50% speed inducer stage at the inlet of the pump improves the inlet performance characteristics as noted above. For example, in the past, 20 psi may have been introduced into the high-speed device but in this arrangement, a reduced level, e.g., 5 psi may instead be introduced into a low-speed device and thus the aircraft/airframe fuel system does not have to be prime reliable. The system can now operate with failed aircraft/airframe components that result in operating at lower supply pressure levels. Another benefit is that free rotating disks that rotate around the impeller usually employ seals that are fixed to the housing. However, since the rotating disks are rotating at a reduced relative speed (for example, at approximately 50% rotational speed), face seals can be used which reduces drag, and improves seal life and reliability.

In this manner, a high speed centrifugal pump (which is good for power consumption, desirable for weight, long life, pressure ripple, and downstream uses where there may be multiple zones) is advantageously used. This is combined with the variable displacement pump that allows the designer or manufacturer to daisy-chain or add metering valves without having to add another box that meters the flow, splits the flow, etc.

The exemplary embodiment has been described with reference to the preferred embodiments. Obviously, modifications and alterations will occur to others upon reading and understanding the preceding detailed description. For example, the number of metering loops, metering valves, throttling valves may vary depending on the number of downstream uses. Further, numerical values of the pressure ranges or shaft speeds are exemplary only and may vary depending on the particular system. This disclosure is intended to describe an exemplary embodiment that can be construed as including all such modifications and alterations insofar as they come within the scope of the appended claims or the equivalents thereof.

What is claimed is:

1. A pump assembly comprising:
   a pump unit including a centrifugal pump and a variable pump supplying pressurized flow;
   a fuel control assembly receiving flow from the pump unit, the fuel control assembly including at least first and second metering valves and at least first and second throttling valves where the first metering valve and the first throttling valve form a first metering valve/throttling valve pair, and the second metering valve and the second throttling valve form a second metering valve/throttling valve pair;
   a control for the variable pump receiving first and second signals indicative of a pressure differential across one of at least the first and second throttling valves, or across one of at least the first and second metering valve/throttling valve pairs, for altering operation of the variable pump in response to the pressure differential; and at least one selector valve that compares the pressure differentials across at least the first and second throttling valves, or across at least the first and second metering valve/throttling valve pairs, and communicates the signals representative of the throttling valve or the metering valve/throttling valve pair with the lowest differential pressure to the control.

2. The pump assembly of claim 1 wherein the first signal is received from downstream of the metering valve.

3. The pump assembly of claim 1 wherein the first signal is received from downstream of the metering valve and upstream of the throttling valve.

4. The pump assembly of claim 1 wherein the centrifugal pump of the pump unit is a high speed centrifugal pump that is operatively associated with the variable pump to supply fluid pressure needs for the fuel control assembly.

5. The pump assembly of claim 4 wherein at a minimum differential pressure, only the centrifugal pump provides pressure to the fuel control assembly.

6. The pump assembly of claim 5 wherein at higher differential pressures, the variable pump is commanded by the control to a minimum displacement output.

7. The pump assembly of claim 5 wherein when the differential pressure falls below the minimum differential pressure, the control signals for the variable pump to increase the displacement and boost pressure to maintain the minimum pressure level across the throttling valve and cutting off once the minimum differential pressure is achieved.

8. The pump assembly of claim 1 wherein the variable pump is a variable displacement pump having a freely rotating cam ring.

9. The pump assembly of claim 1 wherein the variable pump and the centrifugal pump are driven at different relative rotational speeds.

10. The pump assembly of claim 9 wherein the variable pump is driven at approximately 50% of the rotational speed of the centrifugal pump.

11. The pump assembly of claim 9 wherein the variable pump and the centrifugal pump are coaxially driven.

12. The pump assembly of claim 1 further comprising an inducer stage driven at a reduced rotational speed to operatively improve inlet performance characteristics of the centrifugal pump.

13. A method of operating a pump assembly comprising:
providing a pump unit that includes a high speed centrifugal pump and a variable pump to supply pressurized flow;
providing a fuel control assembly that receives flow from the pump unit, the fuel control assembly including a first metering valve and at least a first throttling valve pair, and a second metering valve and a second throttling valve pair;
monitoring pressure differential across the first and second throttling valves, or across the first and second throttling valve and metering valve pairs;
providing a selector valve to compare the pressure differentials from the monitoring step and communicating a lowest pressure differential set of signals representing the throttling valve or metering valve/throttling valve pair with the lowest differential pressure to a control of the pump unit; and
controlling operation of the pump unit via the control in response to the lowest pressure differential signals from the selector valve.

14. The method of claim 13 wherein the monitoring step includes receiving a first signal from downstream of the metering valve.

15. The method of claim 13 wherein the monitoring step includes receiving a first signal from downstream of the metering valve and upstream of the throttling valve.

16. The method of claim 13 wherein at a minimum differential pressure, the method includes using only the centrifugal pump to provide pressure to the fuel control assembly.

17. The method of claim 16 wherein at higher differential pressures, the method includes commanding the variable pump to a minimum displacement output.

18. The method of claim 16 wherein when the differential pressure falls below the minimum differential pressure, the method includes increasing the displacement of the variable pump to boost pressure to maintain the minimum pressure level across the throttling valve and cutting off once the minimum differential pressure is achieved.

19. The method of claim 13 wherein the monitoring step includes using first and second pressure signals, and the controlling step includes using the signals to hydromechanically alter operation of the pump unit.

20. The method of claim 13 wherein the pump unit providing step includes using a variable displacement ring pump as the variable pump and allowing a cam ring thereof to freely rotate to reduce viscous drag.

21. The method of claim 13 further comprising driving the variable pump and the centrifugal pump at different rotational speeds.

22. The method of claim 21 wherein the driving step includes driving the variable pump at approximately 50% of the rotational speed of the centrifugal pump.

23. The method of claim 21 wherein the pump unit providing step includes using an inducer driven at a reduced rotational speed to operatively improve inlet performance characteristics of the centrifugal pump.

* * * * *